United States Patent
Nanno et al.

(10) Patent No.: US 7,431,819 B2
(45) Date of Patent: Oct. 7, 2008

(54) METHOD AND APPARATUS FOR RELEASING METAL-RESIN JOINT

(75) Inventors: Tetsuo Nanno, Yao (JP); Yoichi Izumi, Habikino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 533 days.

(21) Appl. No.: 10/513,966

(22) PCT Filed: Apr. 24, 2003

(86) PCT No.: PCT/JP03/05312

§ 371 (c)(1),
(2), (4) Date: Nov. 10, 2004

(87) PCT Pub. No.: WO03/097317

PCT Pub. Date: Nov. 27, 2003

(65) Prior Publication Data

US 2005/0155205 A1 Jul. 21, 2005

(30) Foreign Application Priority Data

May 16, 2002 (JP) .............................. 2002-142146

(51) Int. Cl.
*B23H 3/00* (2006.01)
(52) U.S. Cl. .................. 205/702; 29/403.3; 29/762; 156/344; 204/242; 204/230.2; 205/704; 205/705; 205/717
(58) Field of Classification Search ............... 204/242, 204/248, 279, 450, 471, 489, 230.2; 205/704–713, 205/220, 640, 93, 263, 702; 210/243, 634, 210/748; 29/403.3, 762; 156/344
See application file for complete search history.

(56) References Cited

U.S. PATENT DOCUMENTS

| 2,416,294 | A | * | 2/1947 | Eaton ........................ 205/683 |
| 2,480,845 | A | * | 9/1949 | Frager et al. ................ 205/712 |
| 3,575,829 | A | * | 4/1971 | Germain et al. ............... 205/93 |
| 4,020,992 | A | | 5/1977 | Binger et al. |
| 4,043,019 | A | | 8/1977 | Schroder |
| 4,406,411 | A | | 9/1983 | Gall et al. |
| 5,507,926 | A | | 4/1996 | Keller et al. |
| 5,616,641 | A | | 4/1997 | Basch et al. |
| 5,948,276 | A | | 9/1999 | Neureither et al. |

(Continued)

FOREIGN PATENT DOCUMENTS

EP 601 719 A1 5/1994

(Continued)

OTHER PUBLICATIONS

Japanese Office Action issued in Japanese Patent Application No. JP 2003-127007, dated Apr. 10, 2008.

*Primary Examiner*—Joseph W Drodge
(74) *Attorney, Agent, or Firm*—McDermott Will & Emery LLP (57) ABSTRACT

A method for separating a metal-resin joint including the steps of: (1) immersing an article including a metal-resin joint with a counter electrode in an alkaline solution; and (2) applying a voltage over a certain time period between the metal portion of the joint and the counter electrode such that the potential of the metal portion is lower than that of a standard hydrogen electrode.

13 Claims, 3 Drawing Sheets

U.S. PATENT DOCUMENTS

| | | | |
|---|---|---|---|
| 6,045,686 A | 4/2000 | Fenton et al. | |
| 6,436,276 B1 | 8/2002 | Yakobson | |

FOREIGN PATENT DOCUMENTS

| | | |
|---|---|---|
| GB | 1 044 963 | 10/1966 |
| JP | 53-007504 A | 1/1978 |
| JP | 6-166769 | 6/1994 |
| JP | 08-155388 | 6/1996 |
| JP | 8-327512 | 12/1996 |
| JP | 9-187751 | 7/1997 |
| JP | 9-271748 | 10/1997 |
| JP | 2000-037622 A | 2/2000 |
| JP | 2001-164400 A | 6/2001 |
| JP | 2001-316872 A | 11/2001 |
| JP | 2001-334248 | 12/2001 |

\* cited by examiner

FIG. 7

METHOD AND APPARATUS FOR RELEASING METAL-RESIN JOINT

TECHNICAL FIELD

The present invention relates to a method and apparatus for separating the resin portion from the metal portion of a metal-resin joint of an article without physically damaging the article.

BACKGROUND ART

With the recent progress of technological development, there are increasingly strict and complicated requirements for materials in terms of strength, function, safety, cost, etc. Since materials consisting of one material can only meet such requirements in a limited manner, composite materials comprising two or more kinds of materials are being increasingly used. Among them, composite materials comprising a joint of metal and resin are in frequent use. Examples of these combined materials include: electric wires comprising metal wires covered with a resin film; circuit boards for use in electronic equipment comprising integrated metal and resin; and automobile/airplane parts comprising metal and metal, or metal and resin, which are bonded with an adhesive.

Following such technological development, Japanese Laid-Open Patent Publication No. 2001-316872 proposes a composite material comprising a firm joint of metal and resin which utilizes both insert molding and bonding. However, while the technique of making metal-resin composites progresses, the establishment of recycling technologies is strongly desired in view of environmental problems regarding global warming and waste disposal. The recycling technologies have also been promoted by the force of law since the Electric Appliance Recycling Law went into effect.

As in the slogan "If mixed, it's waste; if separated, it's a resource", the basics of recycling are to separate materials by kind. Products comprising various constituent materials can be recycled only when they are decomposed/separated into their respective constituent materials. Home electric appliances, in particular, include a large number of components comprising a metal-resin joint. Therefore, there is a strong demand for a simple method of separating these components into their respective constituent materials.

The decomposition/separation methods of composite materials are roughly classified into three kinds: mechanical methods; chemical methods; and electrochemical methods. In the case of an electric wire, for example, a mechanical method in which the electric wire is cut into a suitable length and the resin film is separated from the metal wire has been devised. Separating resin from metal by a mechanical method is relatively easy in such cases as the electric wire in which the metal portion and the resin portion are not bonded with an adhesive or the like. However, if the metal portion and the resin portion are firmly bonded, it is basically impossible to separate the two portions by a mechanical method.

Therefore, conventionally in use is a method in which a composite material comprising a metal-resin joint is incinerated and valuable metals are collected from the remaining ashes. This method, however, requires a large amount of energy and presents a problem of carbon dioxide and dioxin emissions.

There is also a well-known method in which a composite material comprising a metal-resin joint is frozen in liquid nitrogen or the like to embrittle the resin and is then impacted to destroy the resin portion in order to recover the metal portion (U.S. Pat. No. 4,406,411, U.S. Pat. No. 4,043,019, and U.S. Pat. No. 4,020,992). However, this method requires high cost for separation because of the necessity to use liquid nitrogen or the like and, in addition, is not capable of completely separating the resin from the metal in principle.

Another known method of separating a metal-resin joint shreds a composite material by a shredder. The particulate material obtained by shredding is subjected to centrifugation (U.S. Pat. No. 5,948,276), or is dispersed in liquids having various specific gravities (U.S. Pat. No. 5,616,641), in order to separate the composite material into its respective constituent materials. It is difficult, however, to completely separate resin from metal by shredding using a shredder.

Also, Japanese Laid-Open Patent Publication No. Hei 6-166769 proposes a method in which a composite material of metal and resin is heated and thereafter pressed by twin rollers in order to separate the resin from the metal portion. However, this method requires a large amount of energy for heating and pressurization and involves destruction of the metal portion, although the separation of the resin from the metal is possible.

On the other hand, Japanese Laid-Open Patent Publication No. Hei 8-327512 proposes an electrochemical method of separating the resin film from a plated steel plate coated with the resin film. This method immerses a plated steel plate coated with a resin film in a methanol solution containing iodine ions and maleic anhydride and anodically dissolves the plated layer applied on the surface of the steel plate. However, this method separates the resin film from the steel plate by maintaining the steel plate at such a potential that the plated layer such as zinc is selectively dissolved, so the method is applicable only to limited metals such as the zinc-plated steel plate and therefore lacks versatility.

Further, Japanese Laid-Open Patent Publication No. Hei 9-187751 proposes a method of removing copper foil or solder from a printed circuit board made of phenol resin by immersing the printed circuit board into a hot alkaline solution and then into water. However, although this method is effective when the resin portion of a composite material is phenol resin that easily swells with alkaline solution, it is not suitable for other composite materials.

As described above, each of these conventional methods of separating a metal-resin joint has its own drawbacks and generally involves destruction of the article comprising a metal-resin joint.

DISCLOSURE OF INVENTION

In the disposal/recycling of an article comprising a metal-resin joint, an object of the present invention is to provide an inexpensive and easy method and apparatus for separating the resin portion from the metal portion with small energy consumption and without destroying at least the metal portion.

The present invention relates to a method for separating a metal-resin joint comprising the steps of: (1) immersing an article comprising a metal-resin joint with a counter electrode in an alkaline solution; and (2) applying a voltage over a certain time period between the metal portion of the joint and the counter electrode such that the potential of the metal portion is lower than that of a standard hydrogen electrode.

In the step (2), the voltage is applied such that the potential of the metal portion of the joint is preferably −2 V or higher and −0.6 V or lower, and more preferably −1.8 V or higher and −1 V or lower, relative to the standard hydrogen electrode.

It is preferable that the alkaline solution have a hydroxide-ion concentration of 0.1 M (M=mole/liter) or higher and 15 M or lower and contain alkali metal cations.

It is more preferable that the alkaline solution have a hydroxide-ion concentration of 3 M or higher and 7 M or lower and contain alkali metal cations.

It is preferable that the alkaline solution have a temperature of 0° C. or higher and 80° C. or lower.

It is preferable to apply ultrasonic vibration to the joint in the step (2).

It is also preferable to apply peeling stress to the joint in the step (2).

The present invention is particularly effective, for example, when the joint is formed by (i) application of a resin material to a metal article, (ii) injection molding of a resin material onto a metal article, or (iii) bonding of a metal and a resin material by vulcanization.

When the metal portion and the resin portion of the joint are bonded with an adhesive or adhesive tape, it is preferable that the adhesive or adhesive tape comprise one or more selected from the group consisting of vinyl acetate resin, acrylic resin, synthetic rubber, nitrile rubber, epoxy resin, cyanoacrylate resin, and polyvinyl chloride resin.

The present invention also pertains to a method for recycling a waste article comprising the steps of: (1) collecting a waste article comprising a metal-resin joint; (2) immersing the joint and a counter electrode in an alkaline solution; (3) separating the resin portion from the metal portion by applying a voltage over a certain time period between the metal portion of the joint and the counter electrode such that the potential of the metal portion is lower than that of a standard hydrogen electrode; and (4) segregating the separated resin portion and the waste article from which the resin portion has been separated.

The present invention also relates to an apparatus for separating a metal-resin joint comprising: (a) a container made of an alkali-proof material for accommodating an article comprising a metal-resin joint; (b) an alkaline solution contained in the container; (c) a counter electrode immersed in the alkaline solution; (d) a power source; (e) a connecting member A for electrically connecting one terminal of the power source with the metal portion of the joint of the article comprising the metal-resin joint; and (f) a connecting member B for electrically connecting the other terminal of the power source with the counter electrode.

As the power source, it is preferable to use a power source capable of generating a voltage of 1.2 V or higher and 3.0 V or lower.

It is preferable that the connecting member A comprise a conductive material and that a portion of the conductive material be coated with an insulating oxide layer.

It is preferable that the conductive material comprise one or more selected from the group consisting of Fe, Ni, Cu, Ag, Au and Zn.

It is preferable that the insulating oxide layer have a specific resistance of 106 Ω·cm or higher.

It is preferable that the insulating oxide layer comprise one or more selected from the group consisting of Si, B, Mg, Na, K, Al, Ca, Ba, Ti, Y, Cr, Ni and Zr.

It is preferable that the insulating oxide layer be coated with an insulating resin layer.

It is preferable that the insulating resin layer comprise one or more selected from the group consisting of polyolefin, polyether, polyacetal and polycarbonate.

BEST MODE FOR CARRYING OUT THE INVENTION

According to the present invention, by immersing an article comprising a firm metal-resin joint in an alkaline solution and applying a cathodic potential to the metal portion of the joint, the interface of the metal-resin joint can be separated with ease.

With respect to the alkali to form an alkaline solution, any alkali that is dissociated in water to produce hydroxide ions is applicable in principle, but it is preferable to use sodium hydroxide or potassium hydroxide which is used conventionally and widely in view of solubility and costs. It is also possible to use a carbonate such as potassium carbonate or sodium carbonate, although it takes a relatively long time to separate the metal-resin joint.

The principle of the present invention is described below.

On the metal surface having a cathodic potential in an alkaline solution, the surface tension of the alkaline solution is lowered by electrocapillarity. The alkaline solution with lowered surface tension strongly tends to enter the metal-resin joint interface. Also, upon formation of a three-phase interface of alkaline solution/oxygen/metal on the metal surface having a cathodic potential, the reduction reaction of oxygen increases the alkali concentration in the vicinity of the metal surface, causing a concentration gradient. As a result, the transport of the alkaline solution to the metal-resin joint interface is promoted. Then, because of the high affinity between the metal and the alkaline solution in comparison with the affinity between the metal and the resin, the alkaline solution keeps entering the metal-resin joint interface, which facilitates the separation of the interface. The separation method of the present invention utilizes this phenomenon.

The potential applied to the metal portion of the metal-resin joint needs to be in such a range that causes a sufficient decrease in the surface tension of the alkaline solution due to the capillary electrical phenomenon. From this viewpoint, the potential applied to the metal portion is desirably −2 V or higher and −0.6 V or lower relative to the standard hydrogen electrode. If the potential of the metal portion relative to the standard hydrogen electrode is higher than −0.6 V, the decrease in the surface tension of the alkaline solution due to the capillary electrical phenomenon is smaller, so that the separation speed of the metal-resin joint tends to be slower. Conversely, if the potential of the metal portion relative to the standard hydrogen electrode is lower than −2 V, the evolution of hydrogen gas is remarkable on the metal surface, thereby raising the possibility of imposing limitations on carrying out the present invention in large-scale processes. Also, if the evolution of hydrogen gas is intense, a large current flows between the metal portion and the counter electrode, so a large amount of energy is consumed. The potential applied to the metal portion of the metal-resin joint is more preferably −1.8 V or higher and −1 V or lower relative to the standard hydrogen electrode.

In the present invention, some energy is consumed by the electrolysis of water. Further, a certain amount of current flows because of the occurrence of the reduction reaction of oxygen at the three-phase interface of alkaline solution/oxygen/metal. However, there is basically no need to pass a current between the metal portion and the counter electrode. Also, the separation method of the present invention can be carried out at room temperature, so there is no particular need to control the temperature. Accordingly, the separation method of the present invention is characterized by extremely small loss of energy. By combining the separation method of the present invention with a step of collecting a waste article comprising a metal-resin joint, it is possible to establish a low-cost and easy recycling method of waste articles.

The hydroxide-ion concentration of the alkaline solution is desirably in the range of 0.1 M or higher and 15 M or lower (M: mol/L). If the hydroxide-ion concentration is lower than 0.1 M, the decrease in the surface tension of the alkaline solution is smaller, causing a decrease in the separation speed of the metal-resin joint. If the hydroxide-ion concentration exceeds 15 M, the alkaline solution has a higher viscosity, so that it enters the metal-resin joint interface at a slower speed, resulting in a decrease in the separation speed. The hydroxide-ion concentration of the alkaline solution is more preferably in the range of 3 M or higher and 7 M or lower.

In the present invention, the whole of the article comprising a metal-resin joint is not necessarily immersed in the alkaline solution. If at least a part of the metal-resin joint interface is in contact with the alkaline solution, the alkaline solution creeps up and therefore spreads through the whole joint interface, leading to separation of the metal-resin joint interface. In this case, if the temperature of the alkaline solution is increased (preferably not higher than 80° C.), the viscosity of the alkaline solution is decreased, making it possible to promptly separate the metal-resin joint.

In order to promote the separation of the metal-resin joint, in addition to increasing the temperature of the alkaline solution, it is effective to apply a potential to the metal portion of the metal-resin joint while applying ultrasonic vibration to the joint or applying stress to the joint.

Since the separation method of the present invention applies a potential in the direction of reduction to the metal portion of the metal-resin joint, it is applicable to a wide range of metal materials. For example, in addition to the cases of the metal portion consisting of one metal, the separation method of the present invention is also effective when the metal portion comprises an alloy of stainless steel, brass or the like. However, when the metal portion of the metal-resin joint comprises a metal such as magnesium that is extremely vulnerable to corrosion by alkaline solution, part of the metal may be dissolved by the alkaline solution in some cases. When the metal portion comprises a metal such as zinc which is corroded by alkaline solution but of which hydrogen evolution overvoltage is sufficiently high, the corrosion speed is very slow, and hence the separation method of the present invention can be preferably applied.

The separation method of the present invention is effective when the metal portion of the metal-resin joint comprises, for example, one or more selected from the group consisting of Al, Ti, Cr, Mn, Fe, Co, Ni, Cu, Zn, Mo, Rh, Pd, Ag, Sn, Re, Os, Ir, Pt, Au, Hg and Pb.

The separation method of the present invention is also effective when the resin portion of the metal-resin joint comprises, for example, one or more selected from the group consisting of polyolefin, polyamide, polyester, polyacetal, polycarbonate, polyarylene ether, polyarylene sulfide, polysulphone, polyether ketone, polyimide, fluorin-containing polymer, natural rubber, phenol resin, polyurethane, silicone resin, and epoxy resin. The separation method of the present invention is particularly suited when the resin portion also needs to be recycled and has alkali resistance.

In the following, joints to which the separation method of the present invention is applicable are listed.

(i) Joints of metal material and resin material using an adhesive (ii) Joints of metal material and resin material using double-side tape or the like (iii) Joints of metal and resin which are formed by applying electroless metal plating to resin material (iv) Joints of metal and resin which are formed by applying resin material to metal material (v) Joints of metal and resin which are formed by injection molding resin material onto a metal component (vi) Joints of resin material and the surface of metal which is modified by organic plating or primer comprising an adhesive or adhesive tape (vii) Joints of metal and resin which are formed by injection molding resin material onto the surface of metal which is modified by organic plating or primer The separation method of the present invention is not suitable in principle when metal and resin are physically joined by means of snap fitting, thermal caulking of resin, screwing, or the like. In this case, however, it is also possible to completely separate the resin from the metal by combining the conventionally used mechanical pulverization with the separation method of the present invention.

Next, one example of an apparatus for separating a metal-resin joint is described with reference to FIG. 1.

Figure 1:
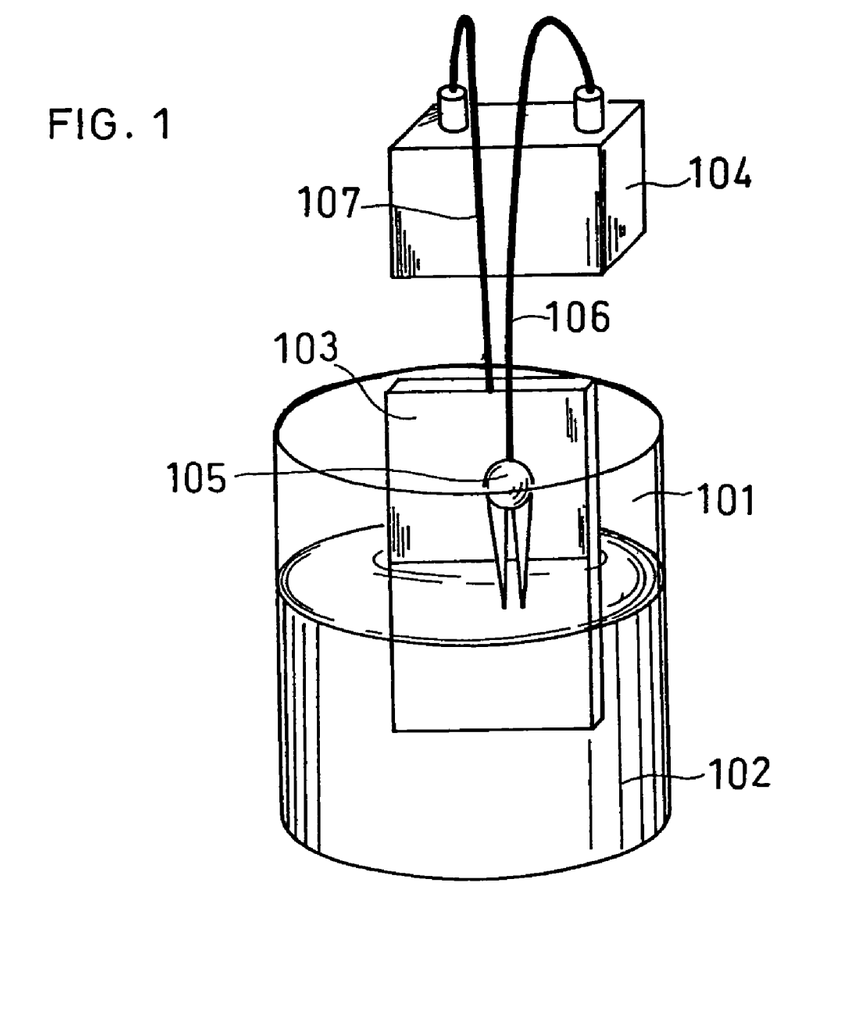
FIG. 1 is a schematic view of one example of a separating apparatus in accordance with the present invention.

An apparatus of FIG. 1 comprises: a container 101 made of an alkali-proof material for accommodating an article comprising a metal-resin joint; an alkaline solution 102 contained in the container 101; a counter electrode 103 immersed in the alkaline solution 102; a power source 104; a holding member 105 for holding the article comprising a metal-resin joint; a connecting member 106 for electrically connecting one terminal of the power source 104 with the metal portion of the article comprising a metal-resin joint; and a connecting member 107 for electrically connecting the other terminal of the power source 104 with the counter electrode 103.

As the container 101 made of an alkali-proof material, for example, a beaker made of tetrafluoroethylene, is preferably used.

Since the counter electrode 103 is exposed to an anodic environment in the alkaline solution 102, it is vulnerable to corrosion. Thus, the electrode used as the counter electrode 103 preferably comprises a nickel material. Also, during the operation of the apparatus, hydrogen and oxygen are produced at the article comprising a metal-resin joint and the counter electrode 103, respectively, which results in formation of a mist of the alkaline solution. Therefore, it is desirable for the apparatus to further comprise an exhaust facility, a facility for removing the alkali from the exhaust, a hydrogen-gas treating system, and the like. Further, during the operation of the apparatus, the electrolysis of water causes a change in hydroxide-ion concentration of the alkaline solution 102. It is thus desirable to control the concentration of the alkaline solution 102 by monitoring the specific gravity and pH of the alkaline solution 102 during the operation of the apparatus.

If the article comprising a metal-resin joint is large enough, a pinching member made of a conductive material, such as a clip, may be used as the holding member 105. In this case, with the metal portion of the article pinched by the pinching means, the metal-resin joint of the article can be immersed in the alkaline solution 102. In such a state, a voltage may be applied between the pinching member and the counter electrode.

Figure 2:
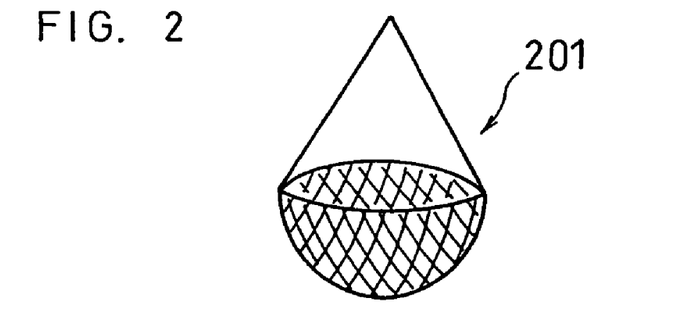
FIG. 2 is an illustration showing one example of a holding member of an article comprising a metal-resin joint.

If the article comprising a metal-resin joint is small, or if a large number of articles are treated at one time, it is preferable to use as the holding member 105 a container comprising a conductive perforated material such as a metal net 201 as illustrated in FIG. 2. Then, with an article comprising a metal-resin joint placed in this container, a voltage may be applied between the container and the counter electrode. Also, by stirring articles comprising a metal-resin joint in the container with a stirring stick, a large number of articles can be separated into metal and resin at one time.

The apparatus is preferably provided with means for applying heat or ultrasonic vibration to the article comprising a metal-resin joint directly or indirectly through the container 101 comprising an alkali-proof material, the alkaline solution 102, the holding member 105, or the like. For example, it is effective to use the container 101 or the holding member 105 equipped with an ultrasonic transducer. It is also effective to provide means for applying peeling stress to the metal-resin joint.

It is noted that there is no need to provide the apparatus with a reference electrode such as a mercury/mercury oxide electrode. The potential applied to the article comprising a metal-resin joint can be checked by detecting the generation of hydrogen at the metal portion of the article. Specifically, if the generation of oxygen is detected, it is thought that the potential applied to the article comprising a metal-resin joint is for example in the range of $-1.8$ V to $-1$ V relative to the standard hydrogen electrode. It is desirable, however, to use an apparatus that is capable of controlling the potential while checking with a monitor the voltage and the current applied between the counter electrode and the article comprising a metal-resin joint.

The power source 104 is desirably a direct current power source, and the power source is preferably capable of generating a voltage of 1.2 V or higher and 3.0 V or lower. With respect to the value of the current flowing between the counter electrode and the article comprising a metal-resin joint, an extremely small current suffices in comparison with common facilities such as electroplating, although it varies depending on the size etc. of the apparatus.

As stated previously, it is thought that the alkaline solution will creep up to the holding member 105, the connecting member 106 and the connecting member 107 during the operation of the apparatus. The arrival of the alkaline solution at the power source may damage the power source. The creeping of the alkaline solution is particularly remarkable in the member that electrically connects the negative electrode terminal of the direct current power source with the metal portion of the metal-resin joint.

In order to suppress the creeping of the alkaline solution, it is effective to coat at least a part of at least one of the holding member 105 and the connecting member 106 with an insulating oxide layer. That is, at least a part of the conductive material constituting the holding member 105 and/or at least a part of the conductive material constituting the connecting member 106 are coated with an insulating oxide layer. At the joint of the metal and the insulating oxide layer, the oxide layer on the metal surface fuses with the insulating oxide layer, like glass lining and enamel (porcelain enamel). The interface of such a joint is highly unlikely to be invaded by the alkaline solution.

Since the creep phenomenon of the alkaline solution by the electrochemical action does not occur on this insulating oxide layer, the power source is protected from the invasion of the alkaline solution. However, generally speaking, the resistance of insulating oxides such as glass to alkaline solution is not so strong. It is therefore preferable to further provide an insulating resin layer for protecting the insulating oxide layer on the insulating oxide layer. Preferable resins used for the insulating resin layer are those having good alkali resistance, for example, polyolefin such as polyethylene and polypropylene, polystyrene, epoxy resin, polyether, polyacetal, polycarbonate, and the like.

The present invention is specifically described below by way of examples.

EXAMPLE 1

(i) Preparation of Sample 1

A steel plate of 0.10 mm in thickness, 50 mm in length and 30 mm in width was prepared. An adhesive comprising a synthetic rubber dissolved in a solvent (quick-curing bond G17 manufactured by Konishi Co., Ltd.) was applied onto one side of this steel plate, and an acrylic plate of polymethyl methacrylate of 50 mm in length, 30 mm in width and 2 mm in thickness was placed thereon so as to cover the steel plate. In this way, five same samples 1a, 1b, . . . 1e having a joint of a steel plate and an acrylic plate were obtained.

(ii) Fabrication of Separating Apparatus

Five 100 ml beakers made of tetrafluoroethylene were prepared, and an aqueous solution of sodium hydroxide (25° C.) of 0.01 M, 0.1 M, 3 M, 7 M or 15 M was introduced in an amount of 100 ml into each of the beakers. These beakers are named 2a, 2b, 2c, 2d and 2e. Into each beaker were immersed a nickel plate (50 mm long, 30 mm wide and 0.5 mm thick) serving as a counter electrode and a mercury/mercury oxide electrode serving as a reference electrode. The counter electrode was connected to the positive electrode terminal of a direct current power source by a lead made of copper such that the counter electrode served as an anode. Also, a clip made of stainless steel was attached to the tip end of a copper lead extending from the negative electrode terminal of the direct current power source.

The part of the cathode-side lead about 1 cm away from the clip was covered with an insulating oxide layer of 5 mm in length and 0.2 mm in thickness, and the insulating oxide layer was further covered with an insulating resin layer of 0.5 mm in thickness. Therein, the insulating oxide layer was made of glass lining comprising $SiO_2$ (30 wt %), $B_2O_3$ (20.5 wt %), $Na_2O$ (15.0 wt %) and $CaF_2$ (12.5 wt %), while the insulating resin layer was composed of epoxy resin.

(iii) Separation Test

The sample 1a was pinched by the cathode-side clip, and the sample 1a was almost entirely immersed in the beaker 2a. Then, with the sample 1a as a cathode and the counter electrode as an anode, a voltage was applied at room temperature between them such that a current of 10 mA flew.

Figure 3:
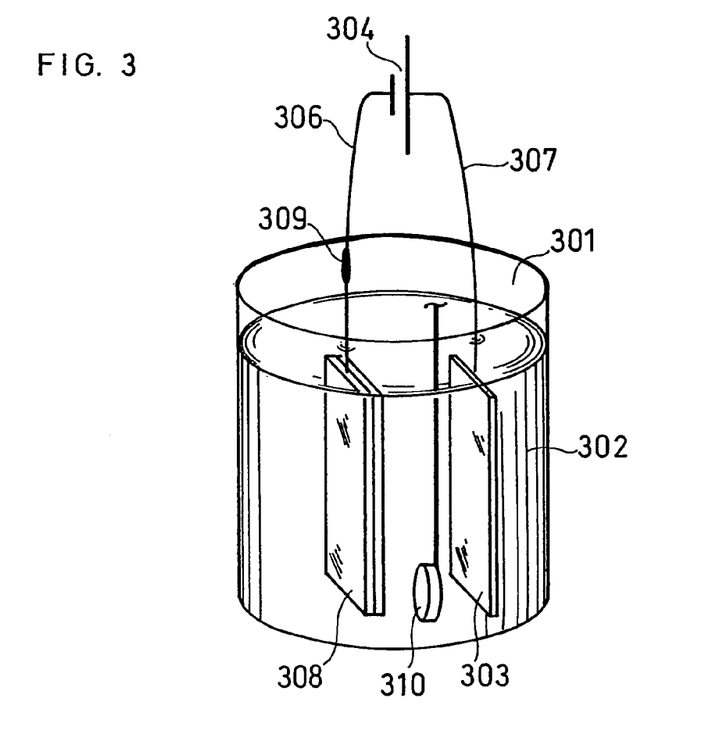
FIG. 3 is a schematic view of a separating apparatus in Example 1 of the present invention.

FIG. 3 shows a state of the apparatus through which the current is passed.

A beaker 301 is almost filled with an aqueous solution of sodium hydroxide 302 of 0.01 M, and a reference electrode (mercury/mercury oxide electrode) 310 is immersed in the aqueous solution of sodium hydroxide 302. A counter electrode 303 is entirely immersed in the aqueous solution of sodium hydroxide 302, and a sample 308 is also immersed entirely in the aqueous solution of sodium hydroxide 302 so as to face the counter electrode 303. A positive electrode terminal of a direct current power source 304 is connected to the counter electrode 303 by a lead 307, while a negative electrode terminal of the direct current power source 304 is connected to the sample 308 by a lead 306. Also, the lead 306 is provided with a coated portion 309 covered with an insulating oxide layer and an insulating resin layer.

A test was continued for a total of 8 hours while checking the presence and absence of separation at the joint of the steel plate and the acrylic plate of the sample 1*a* every 30 minutes after the supply of the current. Also, the potential of the metal portion of the sample 1*a* relative to a standard hydrogen electrode 10 minutes after the supply of the current was obtained from the potential measured using the reference electrode and the pH of the aqueous solution of sodium hydroxide.

The potential $E_O$ of the mercury/mercury oxide electrode relative to the standard hydrogen electrode is expressed as a function of pH. When the potential of the metal portion of the sample relative to the mercury/mercury oxide electrode is defined as $E_{Obs}$, the potential E of the metal portion of the sample relative to the standard hydrogen electrode is derived as follows: $E=E_O+E_{Obs}$.

Table 1 shows the measurement results of the time required to complete separation in the sample 1*a* and the potential of the metal portion of the sample 1*a* relative to the standard hydrogen electrode. Further, by performing the same operations as the above except for the use of the sample 1*b* and the beaker 2*b*, the sample 1*c* and the beaker 2*c* . . . , the times required to complete separation in the samples 1*b* to 1*e* and the potentials of the metal portions of the samples 1*b* to 1*e* relative to the standard hydrogen electrode were measured. The results are shown in Table 1.

TABLE 1

| Sample | Potential of metal portion relative to standard hydrogen electrode (V) | Time required to complete separation (h) |
|---|---|---|
| 1a | −1.65 | >8 |
| 1b | −1.35 | 6 |
| 1c | −1.20 | 5.5 |
| 1d | −1.23 | 4 |
| 1e | −1.25 | 7 |

Table 1 shows that the sample 1*d* exhibited the earliest separation, followed by 1*c*, 1*b* and 1*e* in this order. The sample 1*a* did not exhibit separation within 8 hours. From this, it has been made clear that the hydroxide-ion concentration of the alkaline solution is adequately 0.1 M or higher and 15 M or lower and optimally around 3 to 7 M.

Upon completion of the test of each apparatus, the vicinity of the coated portion 309 of the lead 306 covered with the insulating oxide layer and the insulating resin layer was observed, and it was found that the part of the lead less than a distance of 1 cm from the clip was partially discolored black. It can be judged that this is due to the production of copper oxide as a result of promotion of the oxidation by air of the part of the lead to which the alkaline solution crept up. Conversely, no such discoloration was found in the portion extending from the part with the glass lining to the negative electrode terminal of the direct current power source.

EXAMPLE 2

Next, four apparatuses the same as the test apparatus of the sample 1*d* were produced. Then, by varying the value of the current passed between the sample and the counter electrode at room temperature, the change in time required to complete separation was examined. Table 2 shows the results together with the potentials of the metal portions of the samples relative to the standard hydrogen electrode.

TABLE 2

| Current value (mA) | Potential of metal portion relative to standard hydrogen electrode (V) | Time required to complete separation (h) |
|---|---|---|
| 1 | −1.10 | 6 |
| 10 | −1.23 | 4 |
| 100 | −1.37 | 3.5 |
| 500 | −1.61 | 3.5 |
| 800 | −1.81 | 3.5 |
| 1000 | −1.94 | 3.5 |

At the current value of 1 mA, although it was barely possible to detect hydrogen generation on the surface of the metal portion of the sample immediately after the start of the test, separation of the acrylic plate from the steel plate was observed 6 hours after the start of the test. As the current value was increased to 10 mA and 100 mA, the time required to complete separation was shortened, but even when the current of 500 mA or more was passed, the time required to complete separation remained unchanged from that when the current of 100 mA was passed. Further, when the current of 1,000 mA was passed, bubbles were produced intensely, splashing the alkaline solution. These experimental results suggest that the appropriate value of the current to be passed is 1 to 800 mA. In this case, the potential of the metal portion of the sample relative to the standard hydrogen electrode is around −1.8 to −1 V. Since the value of the current to be passed is dependent on the size of the sample to be separated, it is considered optimal to set the value of the current such that the potential of the metal portion of the sample is −1.8 to −1 V relative to the standard hydrogen electrode.

From the above results, it has been made clear that by applying a potential between the metal portion of the article comprising a metal-resin joint and the counter electrode such that the potential of the metal portion is −2 V to −0.6 V, and more preferably −1.8 V to −1 V, relative to the standard hydrogen electrode, the metal-resin joint can be separated with ease.

EXAMPLE 3

Five apparatuses the same as the test apparatus of the sample 1*d* were produced. Then, by immersing each beaker in hot water baths of various temperatures, separation tests of the metal-resin joints of samples were performed in aqueous solutions of sodium hydroxide of various temperatures. The value of the current passed between the metal portion of the metal-resin joint and the counter electrode was 10 mA.

For three samples, the bath temperatures were set at 25° C., 45° C. and 65° C., respectively, and the same separation tests as that of Example 1 were performed.

For another sample, the beaker was immersed in water of 25° C. in an ultrasonic washing machine (40 kHz, output 200 W), and the same separation test as that of Example 1 was performed.

Figure 4:
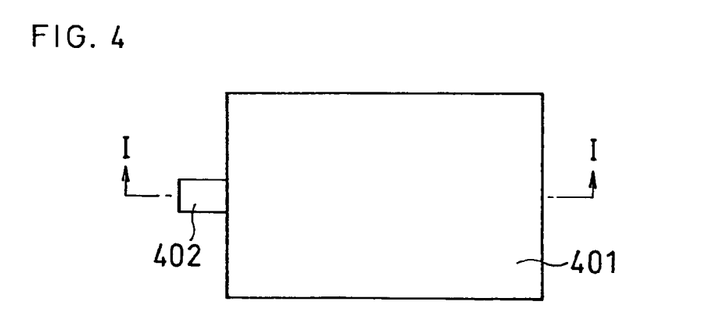
FIG. 4 is a plane view of a sample in Example 3 of the present invention.
Figure 5:
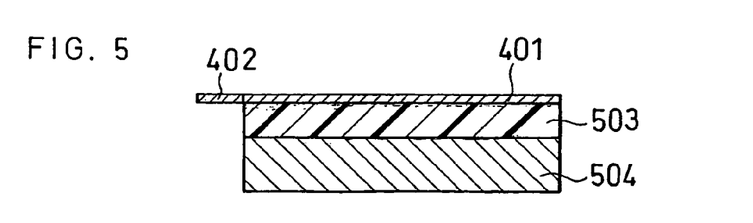
FIG. 5 is a cross-sectional view taken on line I-I of FIG. 4.

The remaining sample was processed as follows. FIG. 4 is a plane view thereof. Also, FIG. 5 is a cross-sectional view taken on line I-I of FIG. 4.

First, to a steel plate 401 of a sample was welded an ear part 402 which was also made of a steel plate. Subsequently, an adhesive comprising a synthetic rubber dissolved in a solvent (quick-curing bond G17 manufactured by Konishi Co., Ltd.)

was applied onto the face of an acrylic plate 503 on the opposite side of the joint of the acrylic plate 503 and the steel plate 401, and a copper piece 504 of approximately 200 g was bonded thereto.

Figure 6:
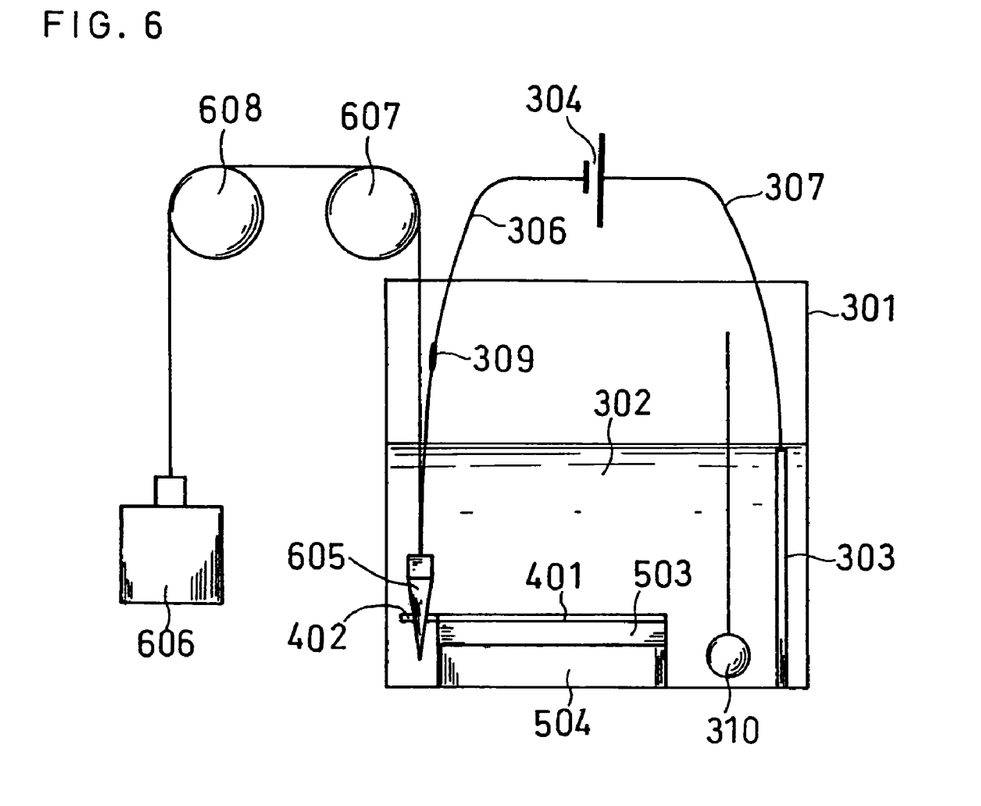
FIG. 6 is a schematic view of a separating apparatus in Example 3 of the present invention.

Next, the test apparatus was arranged as illustrated in FIG. 6.

First, the ear part 402 of the sample was pinched by a clip 605 of the apparatus, and a weight 606 of approximately 100 g was connected to the clip 605 by a string supported by two pulleys 607. This sample was immersed in an aqueous solution of sodium hydroxide 302, as illustrated in FIG. 6. Also, a beaker 301 was immersed in a hot water bath of 25° C. with this apparatus, peeling stress was applied to the metal-resin joint by the gravities applied to the weight 606 and the copper piece 504. By passing a current of 10 mA between the counter electrode 303 and the copper plate 401 during the application of the peeling stress, the same separation test as that of Example 1 was performed.

Table 3 shows the measurement results of the times required to complete separation and the potentials of the metal portions relative to the standard hydrogen electrode in the respective tests.

TABLE 3

| Hot bath temperature (° C.) | Additional condition | Potential of metal portion relative to standard hydrogen electrode (V) | Time required to complete separation (h) |
|---|---|---|---|
| 25 | — | −1.23 | 4 |
| 45 | — | −1.21 | 3.5 |
| 65 | — | −1.16 | 2.5 |
| 25 | Application of ultrasonic vibration | −1.23 | 2.5 |
| 25 | Application of stress | −1.25 | 3 |

From the results of Table 3, it has been confirmed that the time required to complete separation of the metal-resin joint is shortened with the increase in hot water bath temperature. Also, it has been made clear that application of ultrasonic vibration or peeling stress to the metal-resin joint produces the similar effect of promoting the separation to the increase in temperature.

EXAMPLE 4

Wires (0.5 mm in diameter and 50 mm in length) made of aluminum, titanium, chromium, manganese, iron, cobalt, nickel, copper, zinc, molybdenum, rhodium, palladium, silver, rhenium, osmium, iridium, platinum, gold, tin, lead or mercury amalgam (for use in decayed teeth treatment, Ag: 35 wt %, Sn: 15 wt %, Hg: 50 wt %) were prepared.

Figure 7:
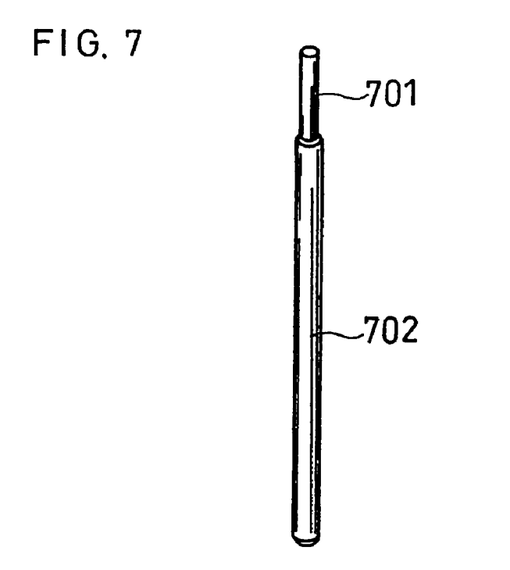
FIG. 7 is a perspective view of a sample comprising a wire coated with varnish in Example 4 of the present invention.

As illustrated in FIG. 7, varnish 702 for tubes was applied onto the surface of a wire 701 over a length of 40 mm. Therein, varnish comprising polyester resin diluted with styrene was used. The application was performed so as to expose the metal at the upper end part 10 mm and the bottom cross-section of the wire.

Separation tests almost the same as that of Example 1 were performed, using the same apparatus as that of Example 1 except for the use of these wires coated with the varnish. Therein, the wire coated with the varnish and a nickel plate were immersed in 50 ml of an aqueous solution of sodium hydroxide (6M) contained in a 100 ml beaker made of tetrafluoroethylene. A current of 2 mA was passed between the upper end part of the wire and the nickel plate such that the wire served as a cathode. Then, the potential of each wire relative to the standard hydrogen electrode and the time required for the vanish to separate from the wire were obtained. Table 4 shows the results.

TABLE 4

| Metal wire | Potential of metal portion relative to standard hydrogen electrode (V) | Time required to complete separation (h) |
|---|---|---|
| Aluminum | −1.57 | <0.5 |
| Titanium | −1.38 | 2 |
| Chromium | −1.32 | 2 |
| Manganese | −1.32 | 2 |
| Iron | −1.33 | 1.5 |
| Cobalt | −1.33 | 1.5 |
| Nickel | −1.32 | 1.5 |
| Copper | −1.32 | 2 |
| Zinc | −1.38 | 1.5 |
| Molybdenum | −1.35 | 2 |
| Rhodium | −1.31 | 2.5 |
| Palladium | −1.31 | 2.5 |
| Silver | −1.38 | 2 |
| Rhenium | −1.31 | 2 |
| Osmium | −1.31 | 2.5 |
| Iridium | −1.31 | 2 |
| Platinum | −1.31 | 2 |
| Gold | −1.32 | 1.5 |
| Tin | −1.37 | 1.5 |
| Lead | −1.40 | 1.5 |
| Amalgam | −1.41 | 2.5 |

From any of the metal wires, the vanish was observed to separate/drop during 1.5 to 2.5 hours after the start of the test. Neither oxidation nor dissolution was observed on the surfaces of all the metals except aluminum, and no change was basically observed in comparison with the state before the coating with the varnish. Dissolution of aluminum was observed only in the wire made of aluminum.

EXAMPLE 5

The same apparatuses as that of the test apparatuses of the sample 1d of Example 1 were assembled except that samples were prepared using a polyvinyl chloride plate instead of the acrylic plate and using various adhesives as listed in Table 5 instead of the adhesive comprising a synthetic rubber dissolved in a solvent (quick-curing bond G17 manufactured by Konishi Co., Ltd.). And, by passing a current of 10 mA between the counter electrode and the steel plate such that the counter electrode served as an anode, separation tests of the metal-resin joints were performed in the same manner as in Example 1. Table 5 shows the kinds of the adhesives and their main components, the potentials of the metal portions of the samples relative to the standard hydrogen electrode, and the times required to complete separation.

TABLE 5

| Adhesive | Main component of adhesive | Potential of metal portion relative to standard hydrogen electrode (V) | Time required to complete separation (h) |
|---|---|---|---|
| Woodworking bond of Konishi Co., Ltd. | Poly vinyl acetate emulsion | −1.21 | 1 |

TABLE 5-continued

| Adhesive | Main component of adhesive | Potential of metal portion relative to standard hydrogen electrode (V) | Time required to complete separation (h) |
|---|---|---|---|
| Quick-curing bond G17 of Konishi Co., Ltd. | Synthetic rubber | −1.23 | 3.5 |
| G103 of Konishi Co., Ltd. | Nitrile rubber | −1.22 | 1.5 |
| Araldite of Ciba-Geigy | Epoxy resin | −1.24 | 3 |
| Aron alpha of Konishi Co., Ltd. | Poly-cyanoacrylate | −1.25 | 3.5 |
| Super-X excel sigma (for vinyl) of Cemedine Co., Ltd. | Polyvinyl chloride | −1.24 | 4 |

In the cases of any adhesives used, separation was observed at the interface between the metal and the adhesive within 4 hours after the start of the test.

EXAMPLE 6

Next, separation tests were performed on the following articles comprising various metal-resin joints.

(i) Sample A

A sample A was prepared in the same manner as in Example 1 except for the use of an acrylic double-side tape (industrial tape Y-4950 manufactured by Sumitomo 3M Ltd.) in place of the adhesive comprising a synthetic rubber dissolved in a solvent (quick-curing bond G17 manufactured by Konishi Co., Ltd.).

(ii) From the door of a junked car, a zinc-plated steel plate painted with epoxy resin was cut out into a rectangular form of 50 mm in length and 30 mm in width. Part of the cut plate was rubbed off with a metal file to expose the metal surface, to prepare a sample B.

(iii) Using the technique disclosed in Japanese Laid-Open Patent Publication No. 2001-316872, a triazine thiol polymer was applied to one side of brass of 50 mm in length, 30 mm in width, and 1.5 mm in thickness. Further, polyphenylene sulfide was injection molded onto the surface of the triazine thiol polymer, to prepare a composite sample C of brass and polyphenylene sulfide.

(iv) A printed circuit board comprising paper phenol (kraft paper impregnated with phenol resin) with a copper foil pattern formed on one side thereof was cut into a size of 50 mm in length and 30 mm in width, to prepare a sample D.

By passing a current of 10 mA between the counter electrode and the steel plate such that the counter electrode served as an anode, separation tests of the metal-resin joints were performed in the same manner as in Example 1 except for the use of the samples A to D. At that time, the samples A to D and the counter electrode were almost entirely immersed in the aqueous solution of sodium hydroxide. Table 6 shows the constituent materials of the samples, the potentials of the metal portions of the samples relative to the standard hydrogen electrode, and the times required to complete separation.

TABLE 6

| Sample | Metal | Resin | Potential of metal portion relative to standard hydrogen electrode (V) | Time required to complete separation (h) |
|---|---|---|---|---|
| A | Copper | Acrylic resin material | −1.24 | 3 |
| B | Zinc plated steel | Modified epoxy resin | −1.56 | 5 |
| C | Brass | Triazine thiol polymer | −1.23 | 4.5 |
| D | Copper | Phenol resin | −1.42 | 2 |

In all of the samples A to D, separation of the resin portion from the metal portion was consequently observed. Also, the separation originated from the joint interface between the metal and the resin. The sample B had an extremely thin resin portion, so it was observed that the separation occurred in such a manner that the resin portion separated from the metal portion during the passage of the current between the sample and the counter electrode. As a result, the resin portion was fragmented into small pieces.

The above results have indicated that the present invention makes it possible to easily separate/segregate the metal-resin joints of the articles comprising various metal-resin joints.

INDUSTRIAL APPLICABILITY

The present invention can separate a metal-resin joint of an article in an inexpensive and simple manner without requiring a large amount of energy. Accordingly, articles comprising a metal-resin joint can be readily separated into their respective constituent materials, so that material recycling is facilitated.

The invention claimed is:

1. A method for separating a metal-resin joint comprising the steps of:
   (1) immersing an article comprising a metal-resin joint with a counter electrode in an alkaline solution;
   (2) applying a voltage over a certain time period between the metal portion of said joint and said counter electrode such that said metal portion becomes cathodic and the potential of said metal portion is −2 V or higher and −0.6 V or lower relative to a standard hydrogen electrode, wherein a connecting member A for electrically connecting one terminal of a power source with the metal portion of said joint of said article comprising the metal-resin joint comprises a conductive material, a part of which is coated with an insulating oxide layer; and
   (3) separating a metal portion of said joint from a resin portion of said joint.

2. The method for separating a metal-resin joint in accordance with claim 1, wherein said alkaline solution has a hydroxide-ion concentration of 0.1 M or higher and 15 M or lower and contains alkali metal cations.

3. The method for separating a metal-resin joint in accordance with claim 1, wherein said alkaline solution has a hydroxide-ion concentration of 3 M or higher and 7 M or lower and contains alkali metal cations.

4. The method for separating a metal-resin joint in accordance with claim 1, wherein said alkaline solution has a temperature of 0° C. or higher and 80° C. or lower.

5. The method for separating a metal-resin joint in accordance with claim 1, wherein said step (2) comprises applying ultrasonic vibration to said joint.

6. The method for separating a metal-resin joint in accordance with claim 1, wherein said step (2) comprises applying peeling stress to said joint.

7. The method for separating a metal-resin joint in accordance with claim 1, wherein said metal portion comprises one or more selected from the group consisting of Al, Ti, Cr, Mn, Fe, Co, Ni, Cu, Zn, Mo, Rh, Pd, Ag, Sn, Re, Os, Ir, Pt, Au, Hg and Pb.

8. The method for separating a metal-resin joint in accordance with claim 1, wherein the resin portion of said joint comprises one or more selected from the group consisting of polyolefin, polyamide, polyester, polyacetal, polycarbonate, polyarylene ether, polyarylene sulfide, polysulphone, polyether ketone, polyimide, fluorin-containing polymer, natural rubber, phenol resin, polyurethane, silicone resin, and epoxy resin.

9. The method for separating a metal-resin joint in accordance with claim 1, wherein said joint is formed by (i) application of a resin material to a metal article, (ii) injection molding of a resin material onto a metal article, or (iii) bonding of a metal and a resin material by vulcanization.

10. The method for separating a metal-resin joint in accordance with claim 1, wherein the metal portion and the resin portion of said joint are bonded with an adhesive or adhesive tape, and said adhesive or adhesive tape comprises one or more selected from the group consisting of vinyl acetate resin, acrylic resin, synthetic rubber, nitrile rubber, epoxy resin, cyanoacrylate resin, and polyvinyl chloride resin.

11. A method for recycling a waste article comprising the steps of:
(1) collecting a waste article comprising a metal-resin joint having a resin portion and a metal portion;
(2) immersing said joint and a counter electrode in an alkaline solution;
(3) separating the resin portion from the metal portion by applying a voltage over a certain time period between the metal portion of said joint and said counter electrode such that said metal portion becomes cathodic and the potential of said metal portion is −2 V or higher and −0.6 V or lower relative to a standard hydrogen electrode; and
(4) segregating the separated resin portion and said waste article from which the resin portion has been separated,
wherein a connecting member A for electrically connecting one terminal of a power source with the metal portion of said joint of said article comprising the metal-resin joint comprises a conductive material, a part of which is coated with an insulating oxide layer.

12. An apparatus for separating a metal-resin joint comprising:
(a) a container made of an alkali-proof material for accommodating an article comprising a metal-resin joint having a resin portion and a metal portion;
(b) an alkaline solution contained in said container;
(c) a counter electrode immersed in said alkaline solution;
(d) a power source;
(e) a connecting member A for electrically connecting one terminal of said power source with the metal portion of said joint of said article comprising the metal-resin joint, said connecting member A comprising a conductive material a part of which is coated with an insulating oxide layer;
(f) a connecting member B for electrically connecting the other terminal of said power source with said counter electrode;
(g) a measuring means for measuring the potential of said metal portion; and
(h) a controlling means for controlling the voltage applied between said metal portion and said counter electrode such that said metal portion becomes cathodic and the potential of said metal portion measured by said measuring means is −2 V or higher and −0.6 V or lower relative to a standard hydrogen electrode.

13. The apparatus for separating a metal-resin joint in accordance with claim 12, wherein said insulating oxide layer is coated with an insulating resin layer.

* * * * *